United States Patent
Kobayashi et al.

(10) Patent No.: US 6,790,552 B2
(45) Date of Patent: Sep. 14, 2004

(54) POLYMER ELECTROLYTE FUEL CELL

(75) Inventors: Susumu Kobayashi, Ikoma (JP); Masato Hosaka, Osaka (JP); Kazuhito Hatoh, Osaka (JP); Hikaru Murakami, Saijo (JP); Mikio Takezawa, Ozu (JP); Takayuki Onishi, Kanonji (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 52 days.

(21) Appl. No.: 10/270,238

(22) Filed: Oct. 15, 2002

(65) Prior Publication Data

US 2003/0087142 A1 May 8, 2003

(30) Foreign Application Priority Data

Oct. 16, 2001 (JP) ........................................ 2001-318666

(51) Int. Cl.[7] .............................. H01M 8/04; H01M 8/10
(52) U.S. Cl. ............................... 429/30; 429/35; 429/38
(58) Field of Search ............................. 429/30, 35, 38

(56) References Cited

U.S. PATENT DOCUMENTS

2002/0127461 A1 * 9/2002 Sugita et al. ................. 429/35
2003/0049507 A1 * 3/2003 Sugita et al. ................. 429/26
2003/0054216 A1 * 3/2003 Sugita et al. ................. 429/26

FOREIGN PATENT DOCUMENTS

WO    WO 02/061869 A1    8/2002

* cited by examiner

Primary Examiner—John S. Maples
(74) Attorney, Agent, or Firm—McDermott Will & Emery LLP

(57) ABSTRACT

A polymer electrolyte fuel cell in which neither cross leakage nor outward leakage occurs with the application of low clamping pressures. The polymer electrolyte fuel cell a membrane electrode assembly (MEA) including a polymer electrolyte membrane, a gasket covering the periphery of the electrolyte membrane, and an anode and cathode attached to the electrolyte membrane; and conductive separator plates sandwiching the MEA therebetween. The gasket has seal ribs surrounding each of the manifold apertures, the anode and the cathode, as well as seal ribs formed on both sides of each of gas passages connecting the fuel gas manifold apertures with the anode and gas passages connecting the oxidant gas manifold apertures with the cathode. These seal ribs, except for in the gas passages, are pressed against the separator plates by clamping pressure of the cell stack to form gas sealing sections.

14 Claims, 14 Drawing Sheets

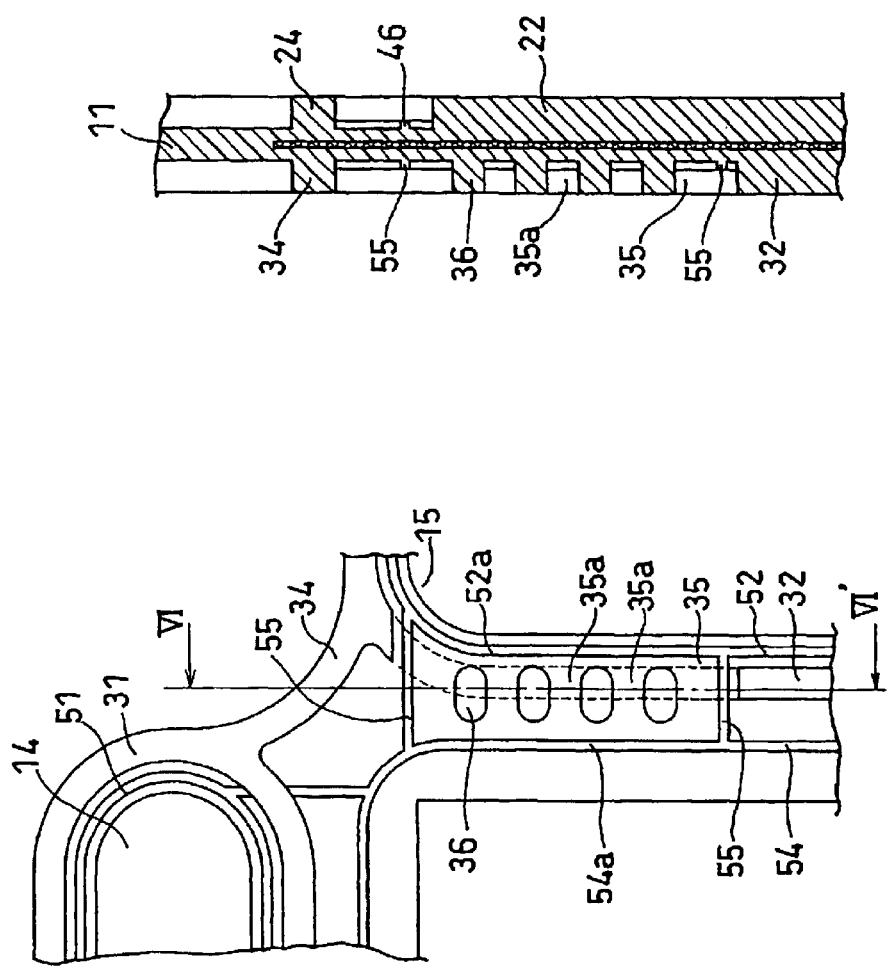

POLYMER ELECTROLYTE FUEL CELL

BACKGROUND OF THE INVENTION

The present invention relates to a solid polymer electrolyte fuel cell, and more particularly to improvements in sealing structure between a gasket disposed on the periphery of a membrane electrode assembly and conductive separator plates.

The most typical example of solid polymer electrolyte fuel cells comprises: an electrolyte membrane-electrode assembly (MEA) composed of a polymer electrolyte membrane, a gasket which is formed of a sealing material and supports the periphery of the electrolyte membrane, an anode attached to one face of the electrolyte membrane, and a cathode attached to the other face of the electrolyte membrane; an anode-side conductive separator plate and a cathode-side conductive separator plate sandwiching the MEA; and gas supply means for supplying a fuel gas and an oxidant gas to the anode and the cathode, respectively. The important problem with this kind of fuel cells is cross leakage of the gasses which takes place in the vicinity of gas manifold apertures. In the vicinity of oxidant gas manifold apertures, cross leakage of the gasses occurs because the gasket sags into a fuel gas flow channel of the conductive separator plate. The sagging consequently creates two leak paths leading to the oxidant gas manifold aperture from the anode. One of the leak paths is created by separation of the gasket from the anode side of the separator plate, and the other is created by separation of the gasket from the electrolyte membrane as the result of the sagging of the gasket. Likewise, in the vicinity of fuel gas manifold apertures, gas leakage occurs because the gasket sags into an oxidant gas flow channel of the conductive separator plate.

In order to solve this problem, the inventors of the present invention made the following proposal in WO 02/061869. The entire disclosure thereof including specification, claims, drawings and summary is incorporated herein by reference in its entirety. That is, the disclosure is a method in which a plurality of through holes 2 are arranged in the periphery of an electrolyte membrane 1 as illustrated in FIG. 1, and a gasket is integrally joined to the periphery of the electrolyte membrane by injection molding so as to include the through holes. In this method, the portion of the gasket covering one face of the electrolyte membrane is connected to the portion covering the other face thereof at a portion covering the edge of the electrolyte membrane and at the through holes, so that it is possible to eliminate the cross leakage of the gasses caused by separation of the gasket from the electrolyte membrane. Also in this method, the gasket is provided with ribs formed between the anode and the oxidant gas manifold apertures, and the ribs are fitted into grooves formed in the corresponding positions of a separator plate to prevent the separation of the gasket from the anode side of the separator plate. Likewise, ribs formed on the gasket are fitted into grooves of a separator plate to prevent the separation of the gasket from the cathode side of the separator plate. These ribs of the gasket not only mate the gasket to the separator plates but also function as flowing paths of molten resin in molding. Thus, the ribs are indispensable for gaskets that are thin and injection molded.

However, the prevention of the gas leakage by fitting the ribs of the gasket into the grooves of the separator plates has been found insufficient.

In injection molding, molded articles are inevitably subject to mold shrinkage. Since the degree of mold shrinkage varies depending on the molding materials and the shapes of the molded articles, it is normally difficult to predict beforehand. Thus, in case the degree of mold shrinkage has been beyond the prediction, there arises a problem of the ribs of the gasket not fitting into the grooves of the separator plates properly. Therefore, in the above-described structure of fitting the ribs of the gasket into the grooves of the separator plates, the gasket needs to be molded beforehand, and then the separator plates need to be designed based on the actual measurement of the mold shrinkage of the molded gasket. Since the separator plates are composed mainly of metal or carbon, even the molded separator plates are hardly subject to mold shrinkage. Thus, designing the separator plates so as to mate with the molded gasket is a rational process. This process, however, has a disadvantage that the design of the separator plates must be done each time the rate of mold shrinkage is changed, for example, by the change of the gasket material.

In the above-described structure, the sealing between the gasket and the separator plates is basically surface to surface sealing except for the mating portions, and both the gasket and the separator plates therefore need to have sufficient surface accuracy. However, on the surface of an injection molded article, gate marks and ejector pin marks are left inevitably. The heights of the marks are usually approximately a few tens of microns depending on the mold structures and materials. In the above-described structure of the fuel cell, when the gate marks and ejector pin marks are left on the rib portions or the standard thickness portion (the portion without the ribs) of the gasket, except for the case where the gasket is extremely elastic, clearances are produced between the separator plates and the gasket to cause cross leakage or outward leakage of the gases. This problem is common particularly in the case of using molded separator plates. Since the separator plates have almost no elasticity, such surface irregularities need to be compensated solely by the gasket. That is, it is necessary to use a highly elastic material for the gasket. However, such a highly elastic material has a problem in that it usually has poor mechanical strength and therefore tends to creep.

Further, in the above-described surface to surface sealing, a sufficient surface load needs to be applied onto both the gasket and the separator plates. Hence, another problem arises in that the clamping pressure of the cell stack must be heightened unnecessarily. This also involves a problem of requiring unnecessarily large-scale clamping members such as end plates, bolts, springs, etc., the large-scale clamping members giving a negative effect in terms of the volume.

BRIEF SUMMARY OF THE INVENTION

In one aspect of the present invention, small ribs for sealing are formed on the gasket in order to ensure the sealing between the gasket and the separator plates instead of sealing the gasket and the separator plates in a surface to surface manner.

In another aspect of the present invention, while ribs and other moldings of the conventional gasket are retained for ensuring moldability and mechanical strength, small ribs for sealing are formed on portions of the gasket which would conventionally come in contact with the separator plates in a surface to surface manner. The mechanical strength required for the gasket is bending strength, tortional strength or the like, and particularly a strength which allows the gasket not to sag into the gas flow channels of the separator plates. The former ribs are hereinafter referred to as dummy ribs since they make no direct contribution to the sealing, and the latter ribs are hereinafter referred to as seal ribs.

The present invention is directed to a polymer electrolyte fuel cell comprising a unit cell, the unit cell comprising: an electrolyte membrane-electrode assembly (hereinafter referred to as MEA) comprising a polymer electrolyte membrane, a gasket covering the periphery of the electrolyte membrane, an anode attached to one face of the electrolyte membrane, and a cathode attached to the other face of the electrolyte membrane; and an anode-side conductive separator plate and a cathode-side conductive separator plate sandwiching the MEA therebetween.

The gasket and the anode-side and cathode-side conductive separator plates have a pair of fuel gas manifold apertures, a pair of oxidant gas manifold apertures and a pair of cooling water manifold apertures. The gasket comprises a dummy rib which at least partially surrounds one of the seal ribs which will be described later on the anode-situated side and a dummy rib which at least partially surrounds one of the seal ribs on the cathode-situated side. The separator plates comprise a groove into which the dummy rib is fitted loosely such that there is a clearance therebetween. The groove into which the dummy rib is fitted loosely specifically refers to a groove which is larger than the dummy rib both in width and depth/height and into which the dummy rib is fitted without being bound.

The gasket comprises, on the anode-situated side, a seal rib which surrounds a fuel gas flow section extending from one of the fuel gas manifold apertures through the anode into the other of the fuel gas manifold apertures and seal ribs which surround each of the cooling water manifold apertures. The gasket preferably comprises seal ribs surrounding each of the oxidant gas manifold apertures on the anode-situated side.

The gasket further comprises, on the cathode-situated side, seal ribs which surround each of the fuel gas manifold apertures and the cooling water manifold apertures. The gasket preferably comprises a seal rib which surrounds an oxidant gas flow section extending from one of the oxidant gas manifold apertures through the cathode into the other of the oxidant gas manifold apertures.

The above-described seal ribs are pressed against the separator plates by clamping pressure of the cell stack to form gas sealing sections.

The anode-side conductive separator plate comprises, on the anode-facing side, a fuel gas flow path which communicates with the pair of fuel gas manifold apertures, and the cathode-side conductive separator plate comprises, on the cathode-facing side, an oxidant gas flow path which communicates with the pair of oxidant gas manifold apertures. The fuel gas flow path and the oxidant gas flow path communicate with the fuel gas flow section and the oxidant gas flow section of the gasket, respectively.

The dummy rib and the seal ribs are formed on both sides of the standard thickness portion of the gasket. The expression "standard thickness" as used herein refers to the thickness of the gasket which does not include the height of the rib. As described above, the dummy rib has the function of improving the moldability of thin gaskets. Thus, it is preferable that the dummy rib on the anode-situated side substantially surround the seal rib surrounding the fuel gas flow section, and that the dummy rib on the cathode-situated side substantially surround the seal rib surrounding the oxidant gas flow section. More preferably, the gasket further comprises, on the anode-situated side, dummy ribs surrounding each of the seal ribs surrounding the oxidant gas manifold apertures and the cooling water manifold apertures, and further comprises, on the cathode-situated side, dummy ribs surrounding each of the seal ribs surrounding the fuel gas manifold apertures and the cooling water manifold apertures. In molding the gasket, the gate point is preferably formed so as to be connected to the dummy rib. Specifically, in the case of pin gate, pin-point gates are desirably formed on the dummy ribs. In the case of side gate, gates are formed so as to be connected to the dummy ribs, so that molten resin injected from the gates flows along the dummy ribs first, and then flows so as to form the standard thickness portion, seal ribs and other moldings. The width and height of the dummy ribs are primarily determined by the fluidity of the molding resin. With regard to the shape of the dummy ribs, fine adjustments may be made in view of the mechanical strength that will be described later, but in consideration of the thickness of the separator plate, the appropriate height of the dummy ribs is approximately 0.3 to 0.8 mm from the standard thickness portion. As to the thickness of the separator plate, it is preferable to design the separator plate so as to have sufficient mechanical strength even when it is grooved on both sides for receiving the dummy ribs.

It will be apparent to those skilled in the art to which the present invention pertains that the dummy ribs are not necessarily required for gaskets of which standard thickness portions have such a thickness as to secure moldability and mechanical strength.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 5 is an enlarged front view of the main part of the same MEA.

FIG. 6 is a sectional view cut along the line VI–VI' of FIG. 5.

DETAILED DESCRIPTION OF THE INVENTION

Figure 1:
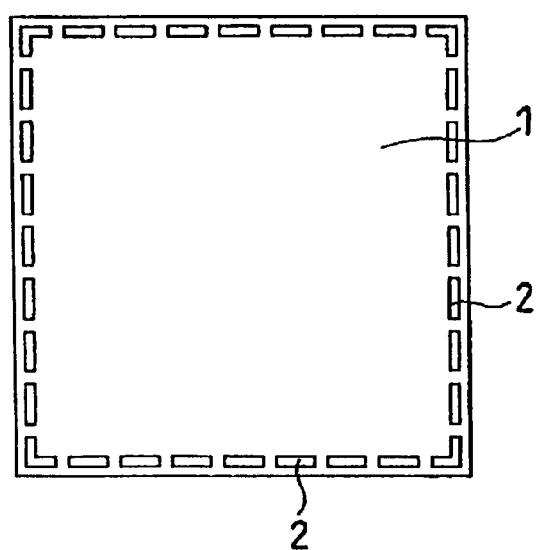
FIG. 1 is a front view of a polymer electrolyte membrane in examples of the present invention.

The present invention provides a polymer electrolyte fuel cell comprising a unit cell, the unit cell comprising:

(1) a membrane electrode assembly comprising a polymer electrolyte membrane, a gasket which is formed of a sealing material and covers a periphery of the electrolyte membrane, an anode attached to one face of the electrolyte membrane, and a cathode attached to the other face of the electrolyte membrane; and (2) an anode-side conductive separator plate and a cathode-side conductive separator plate sandwiching the membrane electrode assembly therebetween, (3) the gasket, the anode-side conductive separator plate and the cathode-side conductive separator plate having a pair of fuel gas manifold apertures, a pair of oxidant gas manifold apertures and a pair of cooling water manifold apertures, (4a) the gasket comprising, on an anode-situated side, a seal rib which surrounds a fuel gas flow section extending from one of the fuel gas manifold apertures through the anode into the other of the fuel gas manifold apertures and seal ribs which surround each of the cooling water manifold apertures, (4b) the gasket comprising, on a cathode-situated side, seal ribs which surround each of the fuel gas manifold apertures and the cooling water manifold apertures, (5) the anode-side conductive separator plate comprising a fuel gas flow path which communicates with the pair of fuel gas manifold apertures on an anode-facing side, (6) the cathode-side conductive separator plate comprising an oxidant gas flow path which communicates with the pair of oxidant gas manifold apertures on a cathode-facing side, (7) each of the seal ribs of the gasket being pressed against the surface of the anode-side conductive separator plate or the cathode-side conductive separator plate by clamping pressure of the unit cell.

The gasket preferably comprises: seal ribs surrounding each of the oxidant gas manifold apertures, formed on the anode-situated side; and a seal rib surrounding an oxidant gas flow section extending from one of the oxidant gas manifold apertures through the cathode into the other of the oxidant gas manifold apertures, formed on the cathode-situated side.

A more preferred aspect of the present invention is a polymer electrolyte fuel cell comprising a unit cell, the unit cell comprising:

(1) a membrane electrode assembly comprising a polymer electrolyte membrane, a gasket which is formed of a sealing material and covers a periphery of the electrolyte membrane, an anode attached to one face of the electrolyte membrane, and a cathode attached to the other face of the electrolyte membrane; and (2) an anode-side conductive separator plate and a cathode-side conductive separator plate sandwiching the membrane electrode assembly therebetween, (3) the gasket, the anode-side conductive separator plate and the cathode-side conductive separator plate having a pair of fuel gas manifold apertures, a pair of oxidant gas manifold apertures and a pair of cooling water manifold apertures, (4a) the gasket comprising, on an anode-situated side, a seal rib which surrounds a fuel gas flow section extending from one of the fuel gas manifold apertures through the anode into the other of the fuel gas manifold apertures and seal ribs which surround each of the cooling water manifold apertures, (4b) the gasket comprising, on a cathode-situated side, seal ribs which surround each of the fuel gas manifold apertures and the cooling water manifold apertures, (4c) the gasket comprising a dummy rib which at least partially surrounds one of the seal ribs on the anode-situated side and a dummy rib which at least partially surrounds one of the seal ribs on the cathode-situated side, (4d) the height of the dummy rib being greater than the height of each of the seal ribs, (5) the anode-side conductive separator plate comprising, on an anode-facing side, a groove into which the dummy rib is fitted loosely such that there is a clearance therebetween and a fuel gas flow path which communicates with the pair of fuel gas manifold apertures, (6) the cathode-side conductive separator plate comprising, on a cathode-facing side, a groove into which the dummy rib is fitted loosely such that there is a clearance therebetween and an oxidant gas flow path which communicates with the pair of oxidant gas manifold apertures, (7) each of the seal ribs of the gasket being pressed against the surface of the anode-side conductive separator plate or the cathode-side conductive separator plate by clamping pressure of the unit cell.

The gasket preferably comprises: seal ribs surrounding each of the oxidant gas manifold apertures, formed on the anode-situated side; and a seal rib surrounding an oxidant gas flow section extending from one of the oxidant gas manifold apertures through the cathode into the other of the oxidant gas manifold apertures, formed on the cathode-situated side.

In a preferred mode of the present invention, the dummy rib on the anode-situated side substantially surrounds the seal rib surrounding the fuel gas flow section, and the dummy rib on the cathode-situated side substantially surrounds the seal rib surrounding the oxidant gas flow section.

In a more preferred mode of the present invention, the dummy rib on the anode-situated side further has a portion surrounding each of the manifold apertures, and the dummy rib on the cathode-situated side further has a portion surrounding each of the manifold apertures.

Another aspect of the present invention is a polymer electrolyte fuel cell comprising a unit cell, the unit cell comprising:

(1) a membrane electrode assembly comprising a polymer electrolyte membrane, a gasket which is formed of a sealing material and covers a periphery of the electrolyte membrane, an anode attached to one face of the electrolyte membrane, and a cathode attached to the other face of the electrolyte membrane; and (2) an anode-side conductive separator plate and a cathode-side conductive separator plate sandwiching the membrane electrode assembly therebetween, (3) the gasket, the anode-side conductive separator plate and the cathode-side conductive separator plate having a pair of fuel gas manifold apertures, a pair of oxidant gas manifold apertures and a pair of cooling water manifold apertures, (4a) the gasket comprising, on an anode-situated side, dummy ribs which surround each of the fuel gas manifold apertures, the oxidant gas manifold apertures and the cooling water manifold apertures; first seal ribs which surround each of the manifold apertures inside each of the dummy ribs; fuel gas passages which include a notch formed at an anode-facing side of the dummy ribs surrounding each of the fuel gas manifold apertures; a second seal rib which surrounds the anode; and third seal ribs which connect the seal ribs, of the first seal ribs, surrounding the fuel gas manifold apertures with the second seal rib, the third seal ribs being provided on both sides of each of the fuel gas passages, (4b) the gasket comprising, on a cathode-situated side, dummy ribs which surround each of the fuel gas manifold apertures, the oxidant gas manifold apertures and the cooling water manifold apertures; first seal ribs which surround each of the manifold apertures inside each of the dummy ribs; oxidant gas passages which include a notch formed at a cathode-facing side of the dummy ribs surrounding each of the oxidant gas manifold apertures; a second seal rib which surrounds the cathode; and third seal ribs which connect the seal ribs, of the first seal ribs, surrounding the oxidant gas manifold apertures with the second seal rib, the third seal ribs being provided on both sides of each of the oxidant gas passages, (4c) the height of each of the dummy ribs being greater than the height of each of the first, second and third seal ribs;

(5) the anode-side conductive separator plate comprising, on an anode-facing side, grooves into which each of the dummy ribs is fitted loosely such that there is a clearance therebetween and a fuel gas flow path which communicates with the pair of fuel gas manifold apertures, (6) the cathode-side conductive separator plate comprising, on a cathode-facing side, grooves into which each of the dummy ribs is fitted loosely such that there is a clearance therebetween and an oxidant gas flow path which communicates with the pair of oxidant gas manifold apertures, (7) the fuel gas passages and the oxidant gas passages of the gasket communicating with the fuel gas flow path of the anode-side conductive separator plate and the oxidant gas flow path of the cathode-side conductive separator plate, respectively, (8) each of the first, second and third seal ribs of the gasket being pressed against the surface of the anode-side conductive separator plate or the cathode-side conductive separator plate by clamping pressure of the unit cell except for in the fuel gas passages and the oxidant gas passages.

In a preferred mode of the present invention, the first seal ribs and the second seal rib on the cathode-situated side of the gasket are located in alignment with the first seal ribs and the second rib on the anode-situated side, respectively, seal ribs are provided on the anode-situated side in alignment with the third seal ribs on the cathode-situated side, and seal ribs are provided on the cathode-situated side in alignment with the third seal ribs on the anode-situated side.

In another preferred mode of the present invention, the dummy ribs surrounding each of the fuel gas, oxidant gas and cooling water manifold apertures on the anode-situated side are connected to one another, and the dummy ribs surrounding each of the fuel gas, oxidant gas and cooling water manifold apertures on the cathode-situated side are connected to one another.

In another preferred mode of the present invention, the gasket has a plurality of reinforcing ribs in each of the fuel gas passages and the oxidant gas passages, the anode-side conductive separator plate and the cathode-side conductive separator plate have a depression for receiving the reinforcing ribs, the depression being formed in the vicinity of each end of the fuel gas flow path and the oxidant gas flow path, the depression is adapted to support the top faces of the reinforcing ribs, the first and second seal ribs located in the fuel gas passages and the oxidant gas passages are pressed against the anode-side conductive separator plate and the cathode-side conductive separator plate, respectively, except for portions corresponding to the fuel gas flow path and the oxidant gas flow path.

In still another preferred mode of the present invention, at least one of the first, second and third seal ribs is composed of a plurality of seal ribs.

The width, height and shape of the seal ribs formed on the gasket of the present invention are determined in consideration of the clamping pressure of the cell stack and the necessary sealing pressure. The height of the seal ribs is determined so as to be at least equal to or higher than the height of the gate marks or other marks of both the separator plate and the gasket. The width and section shape of the seal ribs are determined by the cutting tool for mold working. For example, assume that gate marks of approximately 0.1 mm are left on the surfaces of the gasket and the separator plate. In this case, when grooves of 0.3 mm in depth are cut in a mold with the use of a ball end mill 0.3 mm in diameter, ribs (vault-shaped ribs) 0.3 mm in height and 0.3 mm in width with a semicircular section are formed on the molded article. In this case, the height of the ribs which may be reduced upon application of pressure is 0.2 mm. Generally, the height of the seal ribs is 0.1 to 0.5 mm, and the width is 1 mm or less. The section shape may be a rectangle, semicircle or triangle.

The separator plates to mate with the above gasket have grooves that are large, in terms of both width and depth, enough to fully accommodate each of the dummy ribs. The positions of the grooves are determined in consideration of estimated mold shrinkage of the gasket. The depth of the grooves is desirably greater than the height of the dummy ribs of the gasket in view of the gate marks, ejector pin marks, etc. left on the dummy ribs, and the width of the grooves is desirably large enough to absorb deviation of rib position caused by variations of mold shrinkage of the gasket mainly due to different mold shrinkage rates of materials. Specifically, the depth of the grooves is approximately 0.1 mm greater than the height of the dummy ribs, and the width of the grooves is approximately 0.3 mm greater than that of the dummy ribs.

Figure 13:
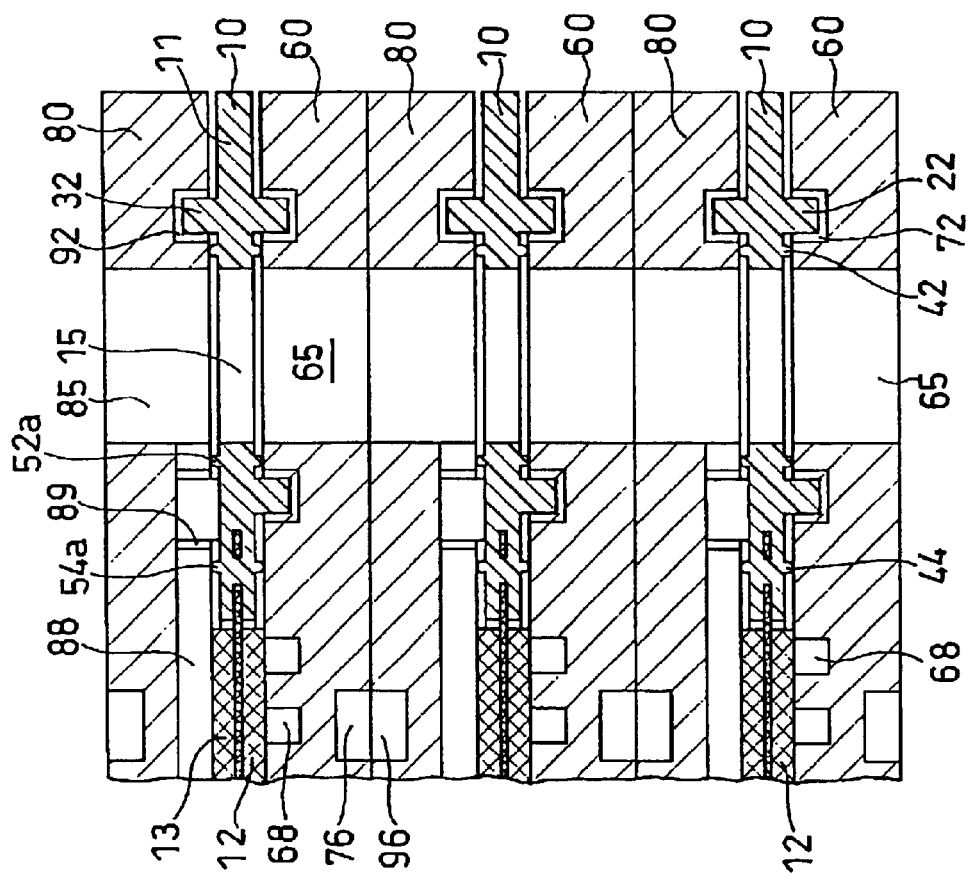
FIG. 13 is a sectional view of a fuel cell in one example of the present invention cut along the line VII–VII' of FIG. 3.
Figure 14:
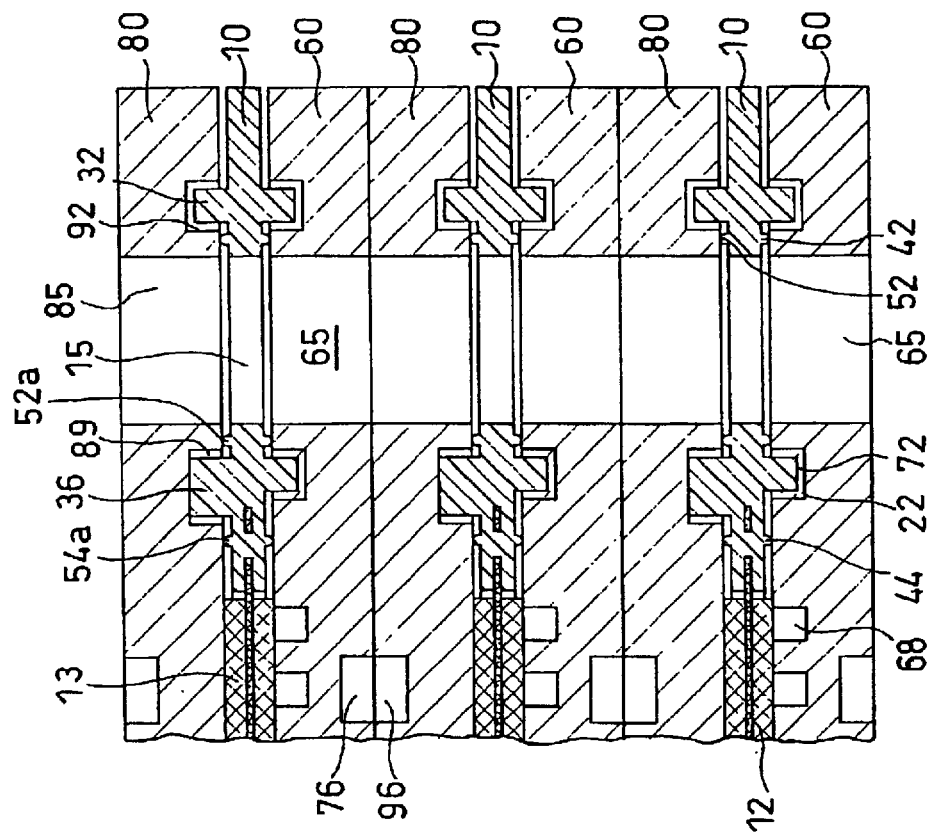
FIG. 14 is a sectional view of the same fuel cell cut along the line VIII–VIII' of FIG. 3.

The relation between the dummy ribs of the gasket and the grooves of the separator plates in an assembled cell is illustrated, for example, in FIGS. 13 and 14. As is clear from these figures, the standard thickness portion and the dummy ribs of the gasket do not come in contact with the separator plates, and the gasket is in contact with the separator plates only at the seal ribs. Thus, the whole clamping pressure is received by the seal ribs in this structure. This structure makes it possible to produce high sealing pressures with the application of low clamping pressures of the stack, thereby improving leak resistant characteristics.

From the viewpoint of moldability, the thickness of the standard thickness portion of the gasket can be reduced only down to a certain level. Thus, the provision of the seal ribs may, in some cases, make the substantial thickness of the gasket greater than the thickness of the gas diffusion layers of the MEA. This case can be effectively handled by thinning the portions of the separator plates which come in contact with the seal ribs. This also applies to the case which needs the use of gas diffusion layers thinner than the moldably thinnest standard thickness portion of the gasket in order to improve cell characteristics. In this way, by modifying the structure of the gasket in combination with the shape of the separator plates combined therewith, the pressure applied on the electrodes and the seal ribs are compensated appropriately.

In the following, preferable embodiments of the present invention will be described in detail. The MEA of FIGS. 2 to 4 and the separator plates of FIGS. 9 to 12 are illustrated as having a different size, but they have the same size.

Embodiment 1

Figure 2:
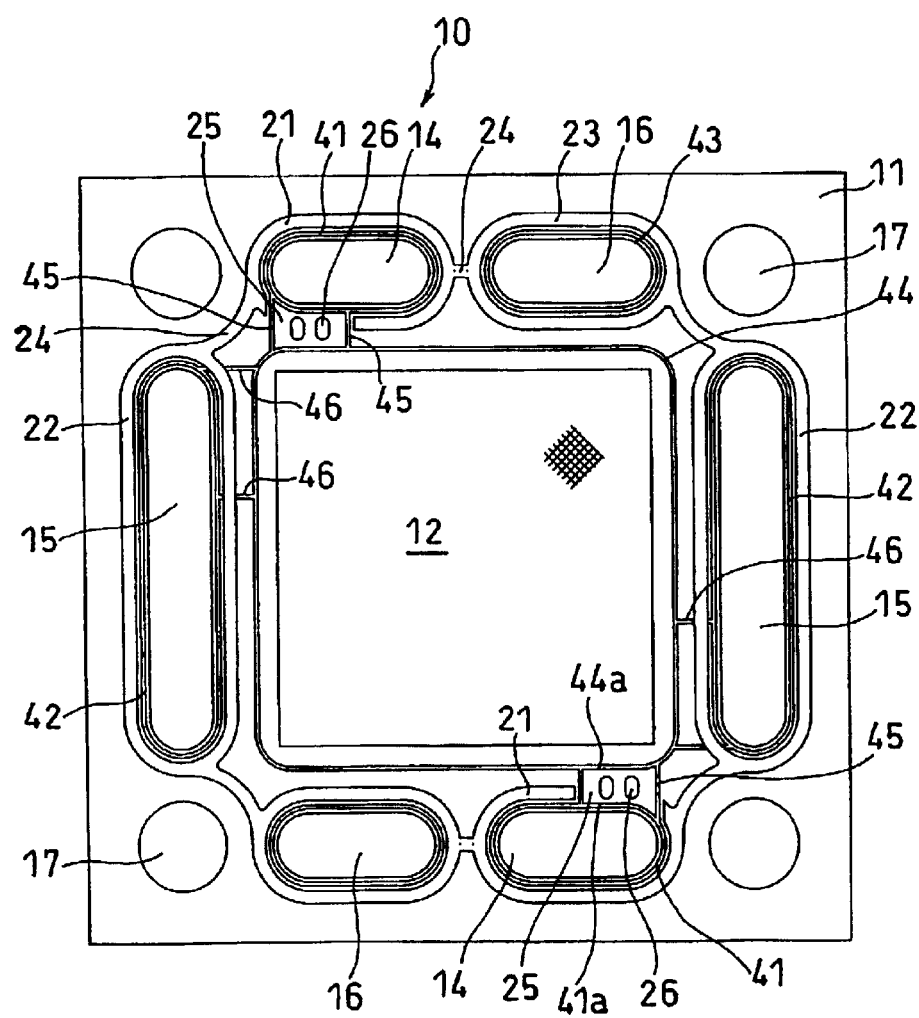
FIG. 2 is a front view of an anode side of an MEA in one example of the present invention.
Figure 3:
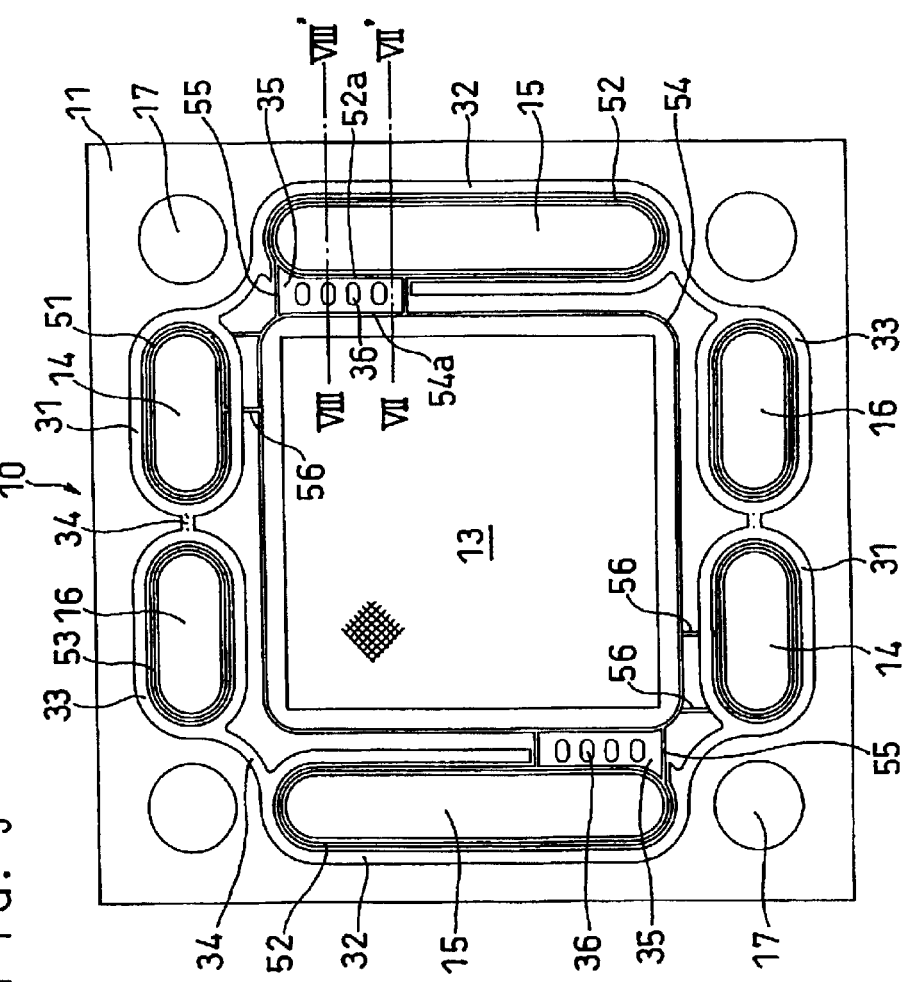
FIG. 3 is a front view of a cathode side of the same MEA.
Figure 7:
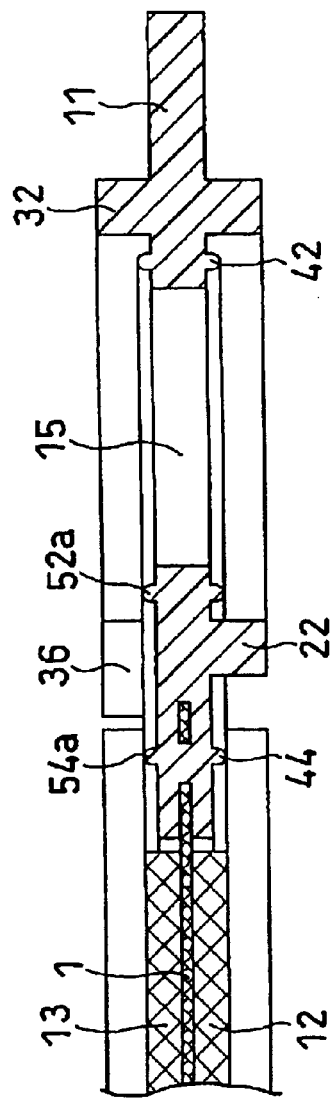
FIG. 7 is a sectional view cut along the line VII–VII' of FIG. 3.
Figure 8:
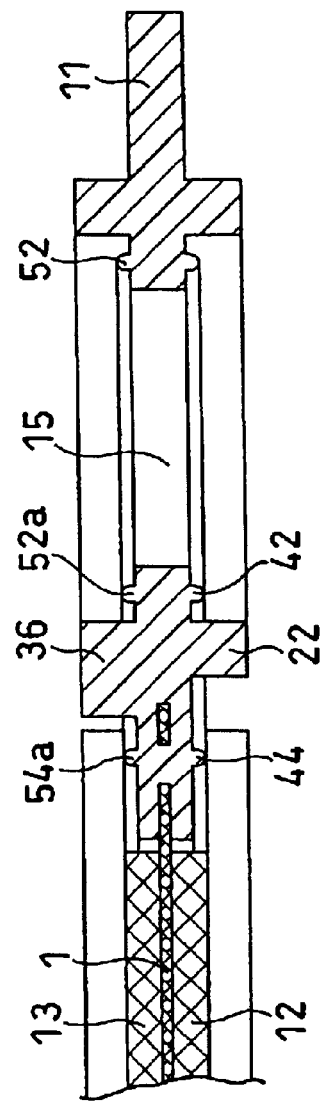
FIG. 8 is a sectional view cut along the line VIII–VIII' of FIG. 3.

FIG. 2 is a front view of an anode side of an MEA in this embodiment, and FIG. 3 is a front view of a cathode side of the MEA. The MEA 10 comprises a polymer electrolyte membrane 1 as shown in FIG. 1, a gasket 11 covering a periphery of the polymer electrolyte membrane 1, an anode 12 attached to one face of the polymer electrolyte membrane 1, and a cathode 13 attached to the other face of the polymer electrolyte membrane 1. The polymer electrolyte membrane 1 has through holes 2 aligned in a peripheral portion. The gasket 11 is one which is injection molded so as to cover the peripheral portion, including the through holes 2, of the polymer electrolyte membrane 1. The portion of the gasket 11 covering one face of the membrane 1 is connected to the portion of the gasket 11 covering the other face thereof at a portion covering the edge of the membrane 1 and at the through holes 2, so that the membrane 1 is securely supported.

The gasket 11 has a pair of fuel gas manifold apertures 14, a pair of oxidant gas manifold apertures 15, a pair of cooling water manifold apertures 16, and four apertures 17 for receiving a clamping bolt of a cell.

The gasket 11 has, on a side on which the anode 12 is situated, dummy ribs 21, 22 and 23 surrounding the fuel gas manifold apertures 14, oxidant gas manifold apertures 15 and cooling water manifold apertures 16, respectively, and dummy ribs 24 connecting the above-mentioned dummy ribs. The dummy ribs 21, which surround each of the fuel gas manifold apertures 14, have a notch at its anode facing side, and a fuel gas passage 25 is provided so as to include the notch. Each of the passages 25 is provided with two reinforcing ribs 26. The gasket 11 has seal ribs 42 surrounding each of the oxidant gas manifold apertures 15 formed inside each of the dummy ribs 22 and seal ribs 43 surrounding each of the cooling water manifold apertures 16 inside each of the dummy ribs 23.

The gasket 11 further has, on the anode-situated side, a fuel gas seal rib surrounding a region including the fuel gas manifold apertures 14, the fuel gas passages 25 and the anode 12. The fuel gas seal rib consists of seal ribs 41 surrounding each of the fuel gas manifold apertures 14, a seal rib 44 surrounding the anode 12, and seal ribs 45 which are disposed on both sides of each of the fuel gas passages 25 so as to connect the seal ribs 41 with the seal rib 44. 41a and 44a, which are parts of the seal ribs 41 and 44 located inside the passages 25, respectively, will be described later.

The gasket 11 has, on a side on which the cathode 13 is situated, dummy ribs 31, 32 and 33 surrounding the fuel gas manifold apertures 14, oxidant gas manifold apertures 15 and cooling water manifold apertures 16, respectively, and dummy ribs 34 connecting the above-mentioned dummy ribs. The dummy ribs 32, which surround each of the oxidant gas manifold apertures 15, have a notch at its cathode facing side, and an oxidant gas passage 35 is provided so as to include the notch. Each of the passages 35 is provided with four reinforcing ribs 36. The gasket 11 has seal ribs 51 surrounding each of the fuel gas manifold apertures 14 formed inside each of the dummy ribs 31 and seal ribs 53 surrounding each of the cooling water manifold apertures 16 inside each of the dummy ribs 33.

The gasket 11 further has, on the cathode-situated side, an oxidant gas seal rib surrounding a region including the oxidant gas manifold apertures 15, the oxidant gas passages 35 and the cathode 13. The oxidant gas seal rib consists of seal ribs 52 surrounding each of the oxidant gas manifold apertures 15, a seal rib 54 surrounding the cathode 13 and seal ribs 55 which are disposed on both sides of each of the oxidant gas passages 35 so as to connect the seal ribs 52 with the seal rib 54. 52a and 54a, which are parts of the seal ribs 52 and 54 located inside the passages 35, respectively, will be described later.

FIGS. 2 and 3 illustrate the most preferable embodiment. On the anode-situated side, the dummy ribs 21, 22 and 23, which surround the manifold apertures 14, 15 and 16, respectively, are unitarily connected by the dummy ribs 24. On the cathode-situated side, the dummy ribs 31, 32 and 33, which surround the manifold apertures 14, 15 and 16, respectively, are unitarily connected by the dummy ribs 34. The dummy ribs 21, 22, 23 and 24 on the anode-situated side are located in alignment with the dummy ribs 31, 32, 33 and 34 on the cathode-situated side, respectively. Such alignment allows the gasket to have sufficient strength even when the standard thickness portion of the gasket is reduced.

The seal ribs 41, 42 and 43 on the anode-situated side, which surround the manifold apertures 14, 15 and 16, respectively, are located in alignment with the seal ribs 51, 52 and 53 on the cathode-situated side, respectively. Further, in alignment with the seal ribs 45 disposed on both sides of each of the fuel gas passages 25 on the anode-situated side, seal ribs 56 are provided on the cathode-situated side, while in alignment with the seal ribs 55 disposed on both sides of each of the oxidant gas passages 35, seal ribs 46 are provided on the anode-situated side. It is noted, however, that at portions where the seal ribs 46 and 56 are to be provided and which overlap the dummy ribs, no seal ribs are provided since the dummy ribs are higher than the seal ribs. As described above, by providing the seal ribs on the anode-situated side in alignment with the seal ribs on the cathode-situated side, it is possible to enhance the sealing effect of the seal ribs.

In the following, conductive separator plates to be combined with the above-described MEA will be described.

Figure 9:
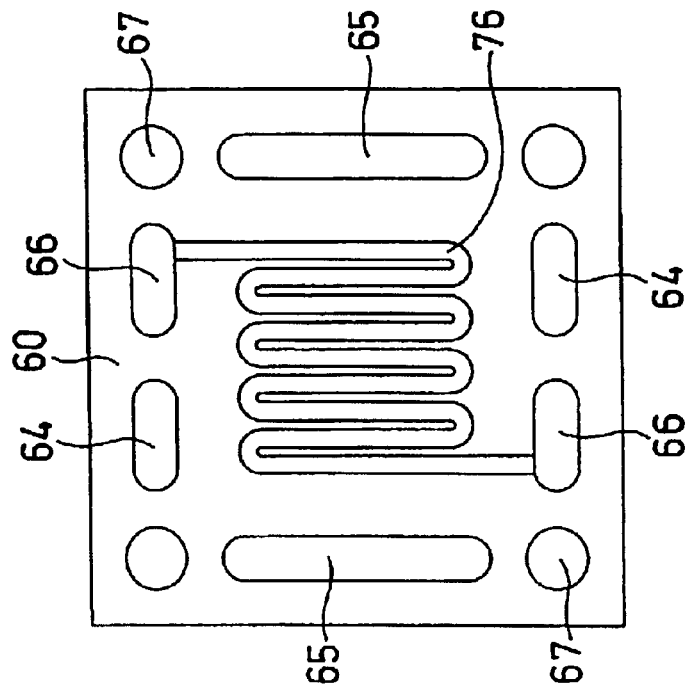
FIG. 9 is a front view of an anode-side conductive separator plate in one example of the present invention.
Figure 10:
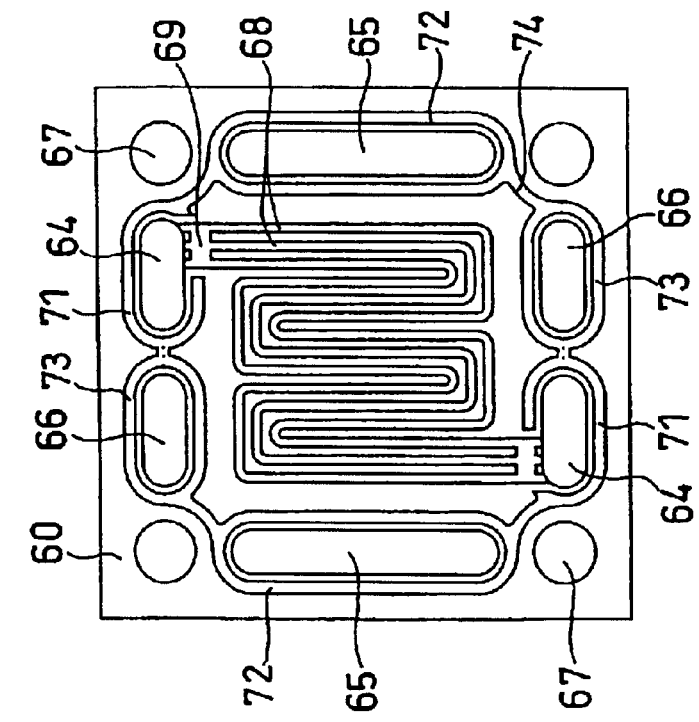
FIG. 10 is a backside view of the same separator plate.
Figure 12:
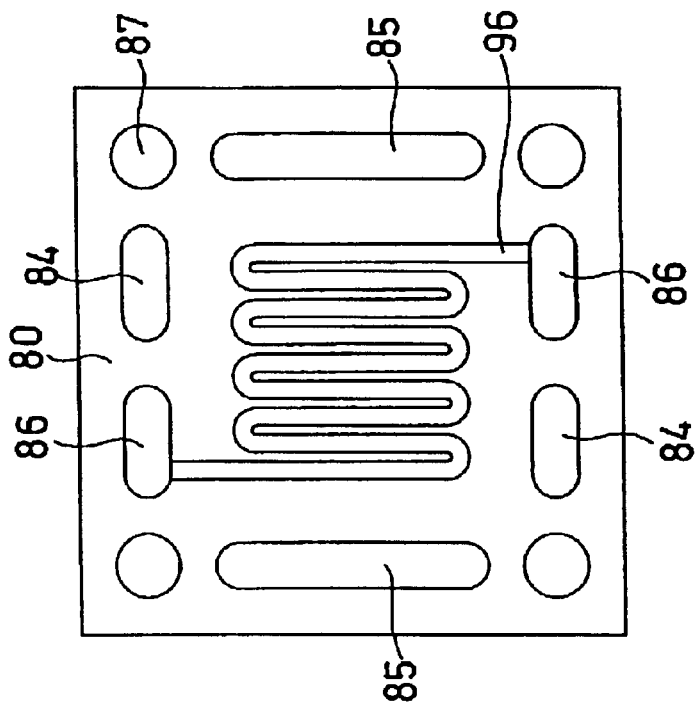
FIG. 12 is a backside view of the same separator plate.
Figure 11:
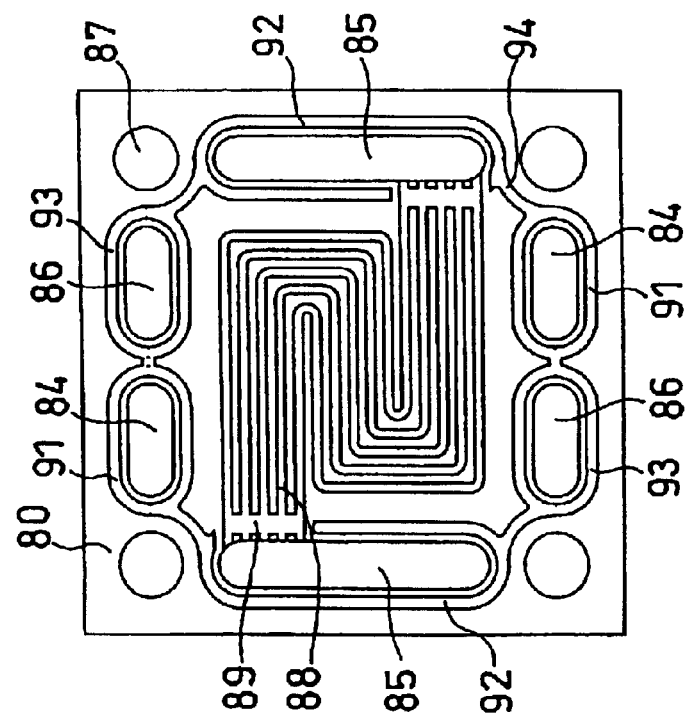
FIG. 11 is a front view of a cathode-side conductive separator plate in one example of the present invention.

FIGS. 9 and 10 illustrate an anode-side conductive separator plate 60, and FIGS. 11 and 12 illustrate a cathode-side conductive separator plate 80.

The anode-side conductive separator plate 60 has a pair of fuel gas manifold apertures 64, a pair of oxidant gas manifold apertures 65, a pair of cooling water manifold apertures 66, and four apertures 67 for receiving a clamping bolt of a cell. The separator plate 60 has, on an anode facing side, grooves constituting a fuel gas flow path 68 communicating with the pair of fuel gas manifold apertures 64. In this separator plate, the gas flow path 68 is comprised of three parallel grooves which are connected to one another in the vicinity of the manifold apertures 64. The portions connecting the three grooves are illustrated as 69. The connecting portions 69 are adapted to come in contact with the top surfaces of the reinforcing ribs 26 inside the gas passages 25 of the gasket 11. It is noted, however, that the connecting portions 69 do not necessarily connect the grooves; they may be any depressions capable of receiving and supporting the ribs 26.

The separator plate 60 has grooves 71 around each of the manifold apertures 64 excluding the the fuel gas flow path 68, and the grooves 71 are adapted to loosely receive each of the dummy ribs 21 of the gasket 11. The separator plate 60 further has, on the anode facing side, grooves 72 surrounding each of the oxidant gas manifold apertures 65, grooves 73 surrounding each of the cooling water manifold apertures 66, and grooves 74 connecting the grooves 71, 72 and 73. The grooves 72, 73 and 74 are adapted for loosely receiving the dummy ribs 22, 23 and 24, respectively, formed on the anode-situated side of the gasket 11.

The separator plate 60 has, on its backside, grooves constituting a cooling water flow path 76 communicating with the pair of cooling water manifold apertures 66.

The cathode-side conductive separator plate 80 has a pair of fuel gas manifold apertures 84, a pair of oxidant gas manifold apertures 85, a pair of cooling water manifold apertures 86, and four apertures 87 for receiving a clamping bolt of a cell. The separator plate 80 has, on a cathode facing side, grooves constituting an oxidant gas flow path 88 communicating with the pair of oxidant gas manifold apertures 85. In this separator plate, the gas flow path 88 is comprised of five parallel grooves which are connected to one another in the vicinity of the manifold apertures 85. The portions connecting the five grooves are illustrated as 89. The connecting portions 89 are adapted to come in contact with the top surfaces of the reinforcing ribs 36 inside the gas passages 35 of the gasket 11. It is noted, however, that the portions 89 do not necessarily connect the grooves; they may be any depressions capable of receiving and supporting the ribs 36.

The separator plate 80 has grooves 92 around each of the manifold apertures 85 excluding the oxidant gas flow path 88, and the grooves 92 are adapted to loosely receive each of the dummy ribs 32 of the gasket 11. The separator plate 80 further has, on the cathode facing side, grooves 91 surrounding each of the fuel gas manifold apertures 84, grooves 93 surrounding each of the cooling water manifold apertures 86, and grooves 94 connecting the grooves 91, 92 and 93. The grooves 91, 93 and 94 are adapted for loosely receiving the dummy ribs 31, 33 and 34, respectively, formed on the cathode-situated side of the gasket 11.

The separator plate 80 has, on its backside, grooves constituting a cooling water flow path 96 communicating with the pair of cooling water manifold apertures 86.

The MEA 10, the anode-side conductive separator plate 60 attached to the anode side of the MEA 10, and the cathode-side conductive separator plate 80 attached to the cathode side of the MEA 10, as described above, constitute a unit cell. A plurality of unit cells are stacked to form a cell stack, an end plate is joined to each end of the cell stack with a current collector plate and an insulating plate interposed between the cell stack and the end plate, and the resultant is clamped by bolts, whereby a fuel cell system is assembled.

FIGS. 13 and 14 are sectional views of the cell stack cut along the line VII–VII' and the line VIII–VIII' of FIG. 3, respectively.

Figure 15:
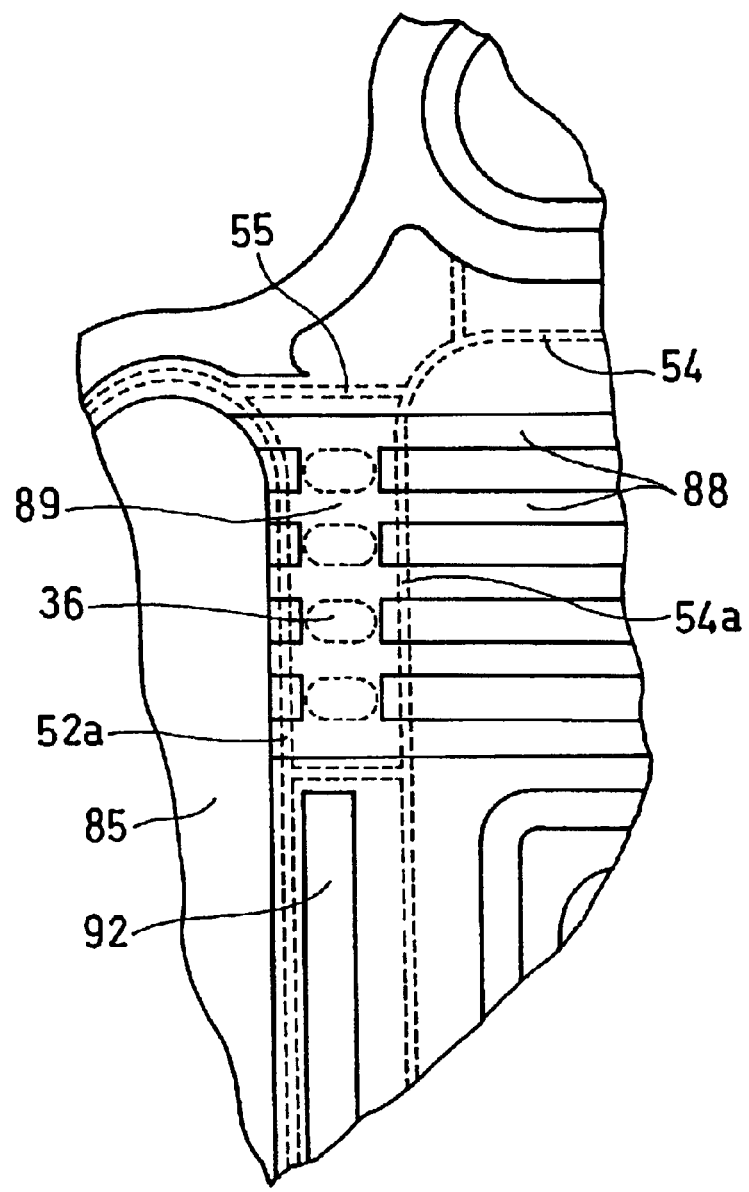
FIG. 15 is an enlarged front view of the inlet and its adjacent part of an oxidant gas flow path of the cathode-side conductive separator plate.

The oxidant gas manifold apertures 15, 65 and 85 of the gasket 11 and the separator plates 60 and 80 communicate with one another. The oxidant gas passages 35 of the gasket 11 correspond to portions of the oxidant gas flow path 88 of the separator plate 80 in the vicinity of the manifold apertures 85. That is, as shown in FIG. 15, inlet portions of the respective grooves of the gas flow path 88 of the separator plate 80 correspond to gaps 35a of FIG. 5 formed between the ribs 36 in the gas passages 35 of the gasket 11. The ribs 36 of the gas passages 35 are located in the connecting portions 89 of the separator plate 80. Thus, an oxidant gas flows from one of the pair of the oxidant gas manifold apertures through the inlet portions of the gas flow path 88 of the separator plate 80 and the gaps 35a into the gas flow path 88 inside the seal rib 54 surrounding the cathode 13. The oxidant gas supplied to the cathode 13 is then discharged into the other manifold aperture. In the gas passages 35, the seal ribs 52a and 54a, excluding their portions corresponding to the gaps 35a between the ribs 36, are pressed against the standard thickness portion of the separator plate 80, as illustrated in FIG. 14.

The fuel gas passages 25 of the gasket 11 and the fuel gas flow path 68 of the separator plate 60 have the same relation as that in the above explanation about the oxidant gas except that the number of the ribs 26 is two.

It should be further noted in FIG. 14 that the seal ribs 42 and 52 surrounding the oxidant gas manifold aperture 15 of the gasket 11 are located at opposite positions of the standard thickness portion of the gasket 11 and are in alignment with one another. The positions at which the anode-side seal ribs 42 of the gasket 11 are pressed against the anode-side separator plate 60 by the clamping pressure of the cell stack are in alignment with the positions at which the cathode-side seal ribs 52 are pressed against the cathode-side separator plate 80. In other words, the pressure-applied positions on the front side of the gasket are the same as those on the back side. Therefore, it is possible to obtain good sealing effects on both sides of the gasket. In case of a major misalignment between the seal ribs on the front and back sides, warpage of the gasket occurs at the seal ribs when the standard thickness portion of the gasket is thin, so that it becomes impossible to obtain good sealing effects. Although the above explanation has been given of the seal ribs 42 and 52, the cathode-side seal ribs 54 and 55 are also located in alignment with the anode-side seal ribs 44 and 46, respectively, in the figures. The anode-side seal ribs 45 are located in alignment with the cathode-side seal ribs 56. Further, with respect to the seal ribs surrounding each of the fuel gas manifold apertures and the seal ribs surrounding each of the cooling water manifold apertures, the anode-side ones are located in alignment with the cathode-side ones.

As illustrated in FIG. 13, the gasket 11 is supported by only one of the separator plates, i.e., the anode-side separator plate 60 in a portion including the gas passage extending from the oxidant gas manifold aperture 15 to the cathode 13. Thus, the gasket 11 may possibly sag into the gas flow path 88 of the cathode-side separator plate 80. However, as illustrated in FIG. 5, since this portion of the gasket has a structure in which the reinforcing ribs 36 on the cathode side and the dummy rib 22 on the anode side intersect at right angles, the bending strength of the gasket is much stronger than that of the conventional gasket which is in the form of a simple flat plate. Therefore, the gasket of this embodiment hardly sags down, and no cross leakage occurs since the seal ribs on the back side are pressed against the separator plate. The reinforcing ribs 26 on the anode side also have the same function as that of the reinforcing ribs 36 on the cathode side. This also applies to the portion including the gas passage extending from the fuel gas manifold aperture to the anode. Modified examples of these portions will be described in the following embodiments.

Although this embodiment has a structure in which a cooling section for flowing cooling water therein is disposed between the cells, the cooling section may be provided every two or three cells. In this case, instead of the above-described combination of the anode-side separator plate and cathode-side separator plate, a separator plate having a fuel gas flow path on one side and an oxidant gas flow path on the other side, which serves both as the anode-side separator plate and as the cathode-side separator plate, may be used where appropriate.

Although this embodiment has been described in terms of the most preferable embodiment, alterations and modifications will become apparent to those skilled in the art without extending beyond the spirit of the present invention. For example, seal ribs are provided in this embodiment so as to surround the fuel gas manifold apertures, the oxidant gas manifold apertures and the cooling water manifold apertures as well as the fuel gas flow path and the oxidant gas flow path; however, when air is used as the oxidant gas, it is possible to omit the seal ribs surrounding the oxidant gas manifold apertures and the oxidant gas flow path. The structure of the separator plate may be modified accordingly in this case. It is understood that such modifications will be apparent to those skilled in the art to which the present invention pertains.

Embodiment 2

Figure 16:
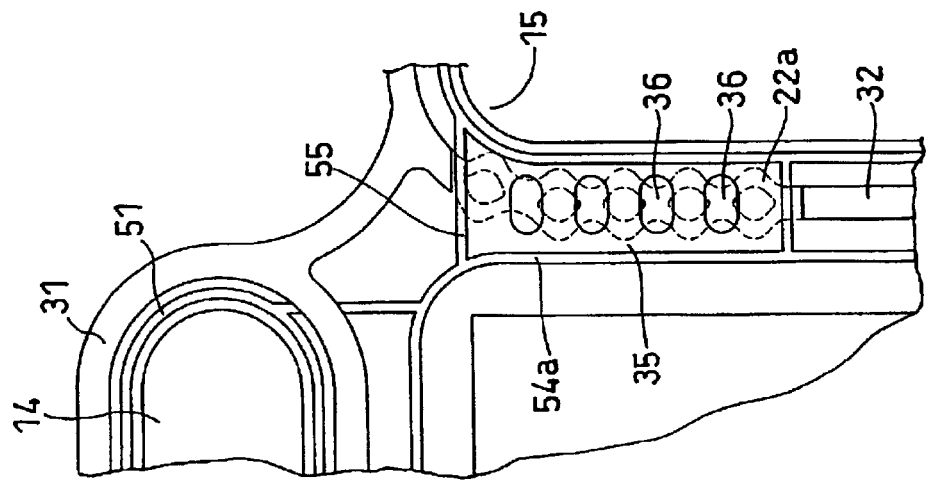
FIG. 16 is an enlarged front view of the main part of a gasket in another example of the present invention.

FIG. 16 illustrates an example in which a double rib is used as the seal rib. In FIG. 16, on the cathode side of the gasket 11, the seal rib 52 surrounding the manifold aperture 15, the seal rib 54 surrounding the cathode, the seal rib 51 surrounding the manifold aperture 14 and the seal rib 55 formed on both sides of the gas passage 35 are all double ribs. The seal ribs formed on the anode side may be made double accordingly. Also, the seal ribs on the anode side may be made single and may be formed in alignment with the center of the double ribs on the cathode side. As described above, the sealing effects can be enhanced also by forming a plurality of parallel seal ribs around each of the manifold apertures, the anode, the cathode or the like.

Embodiment 3

Other embodiments of the portion of the gasket 11 connecting the oxidant gas manifold aperture 15 with the cathode will be described in the following.

In the above embodiments, four reinforcing ribs 36 are arranged at almost even intervals in each of the oxidant gas passages 35 of the gasket 11, and on the other side thereof, i.e., on the anode side, the dummy ribs 22 in the form of a continuous belt are provided. The gas passages 35 are reinforced by the dummy ribs 22 and the reinforcing ribs 36 formed so as to intersect the dummy ribs 22 at right angles.

Figure 17:
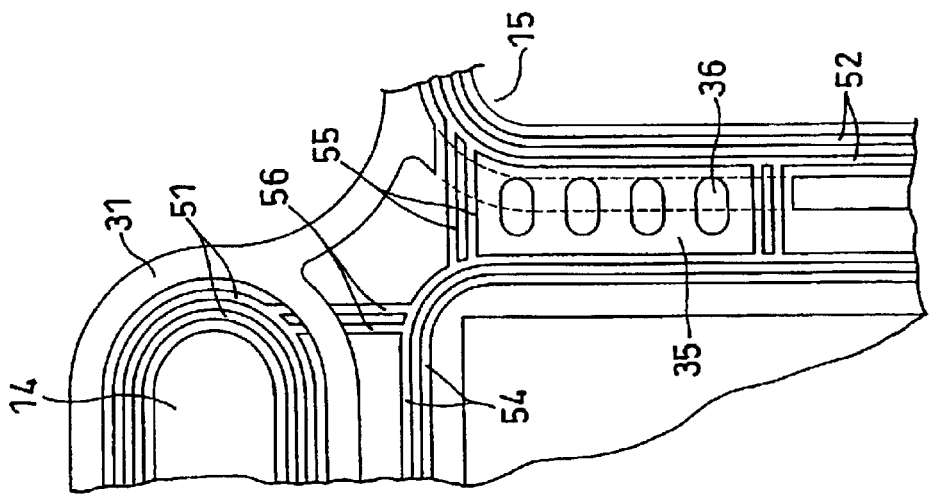
FIG. 17 is an enlarged front view of the main part of a gasket in still another example of the present invention.

FIG. 17 illustrates an example in which the gas passage 35 is the same as that described above, but a rib 22a having the form of connected cylinders is provided, instead of the rib 22, for increasing the strength.

Figure 18:
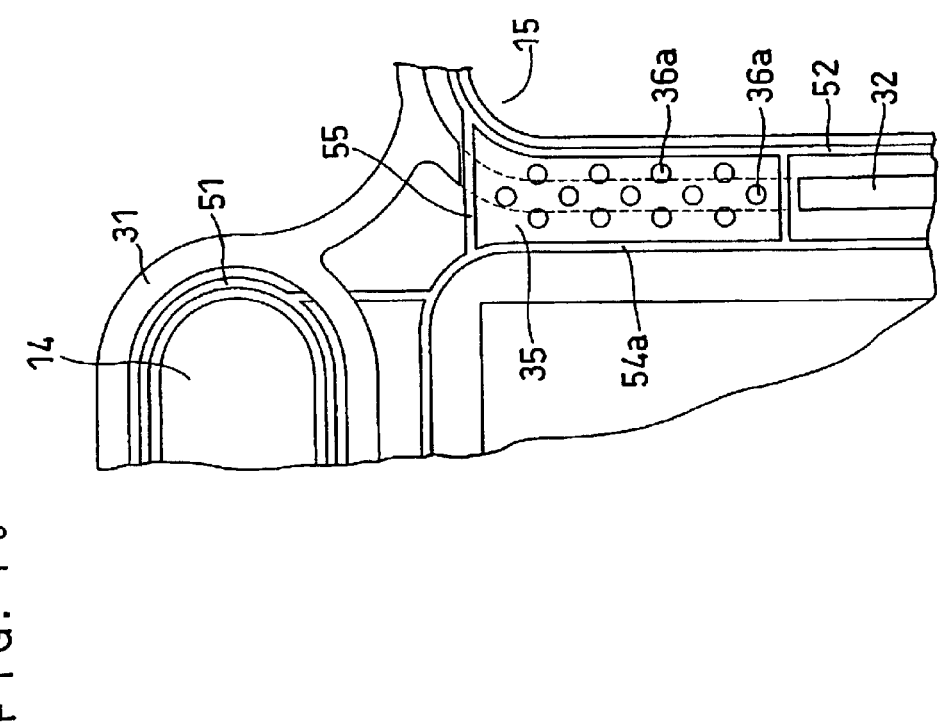
FIG. 18 is an enlarged front view of the main part of a gasket in still another example of the present invention.

FIG. 18 illustrates an example in which an increased number of reinforcing ribs 36a having a smaller diameter are provided in the gas passage 35. The rib 22 on the anode side remains unchanged and is thus in the form of a belt.

As described above, various structures are possible for preventing the cross leakage in the gas passages in the vicinity of the manifold apertures by employing a structure which ensures, without sacrificing gas circulation, that the gas passages are supported from the backside.

Embodiment 4

Figure 19:
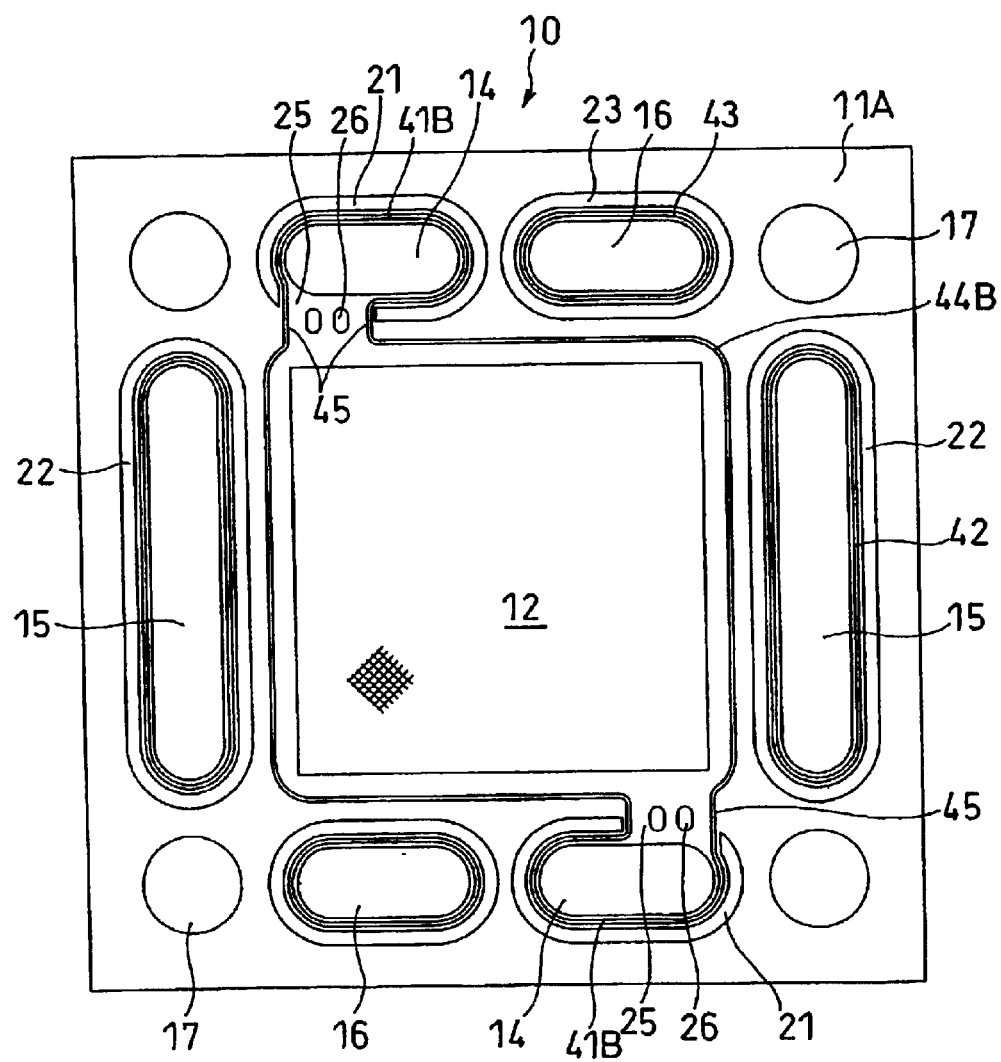
FIG. 19 is a front view of an anode side of an MEA in another example of the present invention.
Figure 20:
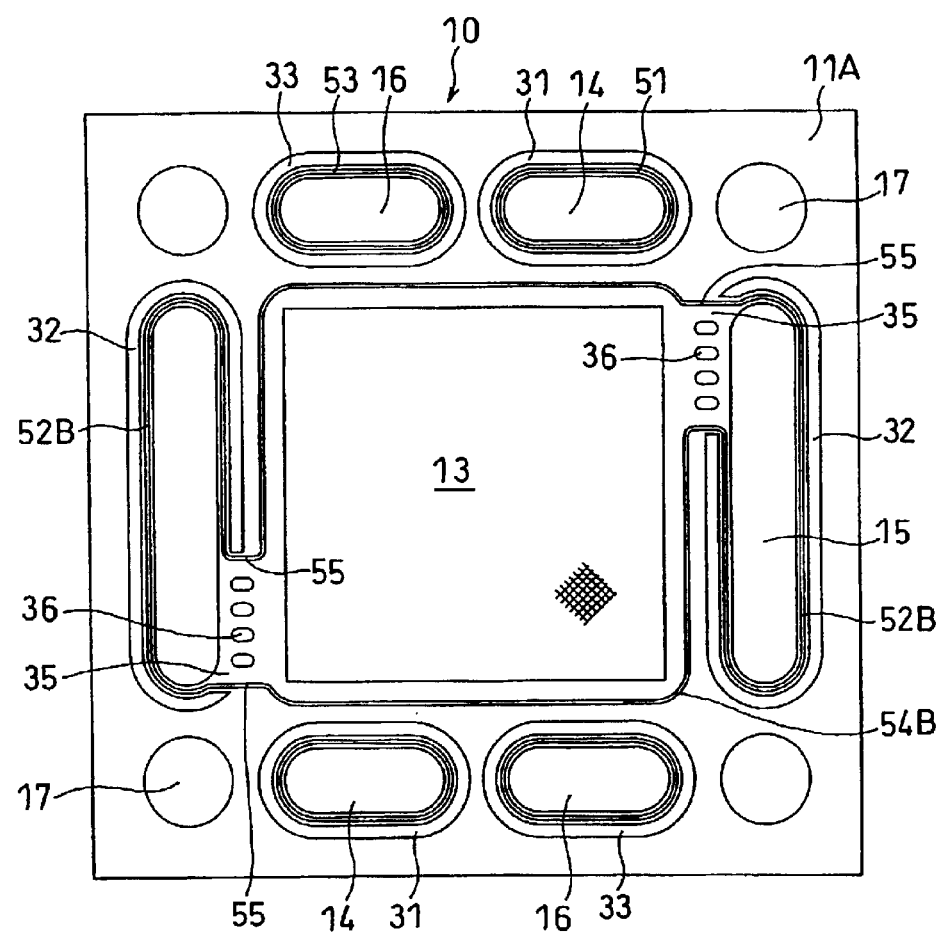
FIG. 20 is a front view of a cathode side of the same MEA.

FIG. 19 is a front view of an anode side of an MEA of this embodiment, and FIG. 20 is a front view of a cathode side thereof. The MEA 10 is slightly different in structure from that of Embodiment 1. A gasket 11A has dummy ribs and seal ribs which are different from those of Embodiment 1.

With respect to the dummy ribs, the dummy ribs 21, 22 and 23 surrounding the manifold apertures 14, 15 and 16, respectively, on the anode-situated side and the dummy ribs 31, 32 and 33 surrounding the manifold apertures 14, 15 and 16, respectively, on the cathode-situated side are independent of one another without having the dummy ribs connecting these dummy ribs. This is the difference from the dummy ribs of the gasket 11 of Embodiment 1.

As to the seal ribs on the anode-situated side, seal ribs 41B surrounding each of the fuel gas manifold apertures 14 do not have a portion crossing each of the fuel gas passages 25 to the anode (41a of Embodiment 1), and a seal rib 44B surrounding the anode does not have a portion crossing each of the fuel gas passages 25 (44a of Embodiment 1). This is the difference from the seal ribs of Embodiment 1.

Accordingly, the fuel gas flow section extending from one of the fuel gas manifold apertures 14 through the anode 12 into the other fuel gas manifold aperture is surrounded by the seal ribs 41B, 45 and 44B.

As to the seal ribs on the cathode-situated side, seal ribs 52B surrounding each of the oxidant gas manifold apertures 15 do not have a portion crossing each of the oxidant gas passages 35 to the cathode (52a of Embodiment 1), and a seal rib 54B surrounding the cathode does not have a portion crossing each of the oxidant gas passages 35 (54a of Embodiment 1). This is the difference from the seal ribs of Embodiment 1.

Accordingly, the oxidant gas flow section extending from one of the oxidant gas manifold apertures 15 through the cathode 13 into the other oxidant gas manifold aperture is surrounded by the seal ribs 52B, 55 and 54B.

In association with the above modifications of the seal ribs, the seal ribs 46 and 56 in Embodiment 1 are omitted.

In association with the above modifications of the dummy ribs, the structure of the grooves for loosely receiving the dummy ribs is duly modified in the separator plates to be combined with the MEA. It is understood that such modifications will be apparent to those skilled in the art.

In this embodiment, the dummy ribs surrounding each of the manifold apertures surround the major part of outside of the seal rib surrounding the anode or the cathode. This structure enables the gasket to retain its mechanical strength. Neighboring two or three dummy ribs may be connected to one another.

The foregoing embodiments have described examples in which dummy ribs are provided on a thin gasket in order to secure moldability and mechanical strength. However, it will be apparent to those skilled in the art that the dummy ribs are not necessarily required for gaskets of which standard thickness portions have such a thickness as to secure moldability and mechanical strength.

In the following, examples of the present invention will be described.

EXAMPLE 1

Figure 4:
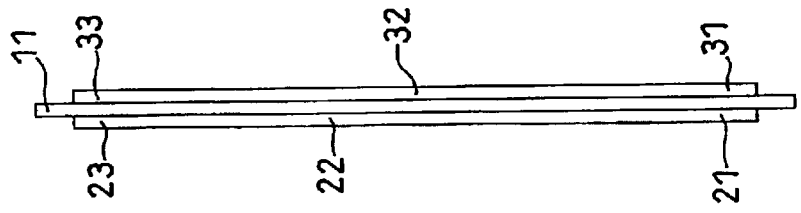
FIG. 4 is a left side view of the same MEA.

A polymer electrolyte membrane (Nafion 117, manufactured by E. I. Du Pont de Nemours & Co. Inc., with a thickness of 50 µm) was punched out with a Thompson die into a shape of 68 mm square having thorough holes aligned in the periphery thereof as illustrated in FIG. 1. The through holes were 1.5 mm in width and 6 mm in length and were formed at pitches of 8 mm. A gasket as illustrated in FIGS. 2 to 4, having outer dimensions of 120 mm square and inner dimensions of 60 mm square, was molded to the polymer electrolyte membrane by a vertical injection molding machine. The gasket was 0.7 mm in thickness at the standard thickness portion, and had, on both sides thereof, dummy ribs 2.0 mm in width and 0.6 mm in height and seal ribs 0.6 mm in width and 0.5 mm in height with a semicircular section 0.3 mm in radius. The reinforcing ribs 36 in the gas passages 35 in the vicinity of the oxidant gas manifold apertures 15 were 2.0 mm in width and were formed at pitches of 4.0 mm. In association therewith, the ribs 22 were arranged on the anode side so as to intersect the reinforcing ribs 36 at right angles. This formed a structure having a high bending strength.

A thermoplastic polyester elastomer (Hytrel M7240, manufactured by Du Pont-Toray Co., Ltd.) was used as the gasket material. The molding conditions were: injection temperature 235° C., mold temperature 50° C. and injection speed 240 mm/sec. With respect to the gate point, eight pin-point gates 0.9 mm in diameter were provided on the above-described dummy ribs for molding the gasket, and the molding under the above-described conditions produced no short shot.

Next, Ketjen Black EC (furnace black manufactured by Ketjen Black International Company), having a specific surface area of 800 $m^2/g$ and a DBP oil absorption of 360 ml/100 g, was caused to carry platinum in a weight ratio of 1:1. 10 g of this catalyst powder was mixed with 35 g of water and 59 g of a dispersion of hydrogen-ion conductive polymer electrolyte in alcohol (9% FSS, manufactured by Asahi Glass Co., Ltd.), and was dispersed with the use of an ultrasonic mixer to prepare an ink for catalyst layer. The ink was applied onto a polypropylene film (Torayfan 50–2500, manufactured by Toray Industries, Inc.) and was dried to form a catalyst layer. The catalyst layer thus obtained was cut into a size of 59 mm×59 mm, and was then transferred onto both faces of the exposed part of the above-described molded polymer electrolyte membrane under the conditions of temperature 135° C. and pressure 32 $kgf/cm^2$. Subsequently, an aqueous dispersion containing a polytetrafluoroethylene (PTFE) fine powder (manufactured by Daikin Industries, Ltd.) and acetylene black (manufactured by Denki Kagaku Kogyo K.K.) in a weight ratio of 1:4 was applied onto one face of a gas diffusion layer made of carbon fiber (TGPH120, manufactured by Toray Industries, Inc.), and was baked at 350° C. for 20 minutes to form a water repellent layer having a density of 2.0 $mg/cm^2$ per unit area of the electrode.

The gas diffusion layers with the water repellent layer formed thereon were bonded to the electrolyte membrane with the catalyst layers transferred thereon, in such a manner that the water repellent layers came in contact with the catalyst layers, by hot pressing at a temperature of 130° C. and a pressure of 1.5 MPa, thereby to produce an MEA. The MEA was subjected to characteristic evaluation tests as described later.

Thereafter, two kinds of carbon separator plates, i.e., an anode-side conductive separator plate having a shape as illustrated in FIGS. 9 and 10 and a cathode-side conductive separator plate having a shape as illustrated in FIGS. 11 and 12, were produced in the following manner. Manifold apertures, flow paths for oxidant gas, fuel gas and cooling water, and grooves for loosely receiving the dummy ribs of the gasket were formed by milling in a resin-impregnated graphite plate (glassy carbon manufactured by Tokai Carbon Co., Ltd.) having outer dimensions of 120 mm×120 mm and a thickness of 3.0 mm. These two kinds of separator plates were bonded to each other with a silicone sealant to produce a separator unit, having a cooling water flow path formed therein, of which one side was the anode-side separator plate and of which the other side was the cathode-side separator plate.

The separator units and the MEAs produced in the above manner were combined to produce a stack of 3 cells connected in series. Since the grooves of the separator plates were 0.3 mm wider and 0.1 mm deeper than the dummy ribs of the gasket, the dummy ribs were positioned so as not to come in contact with the inner walls of the grooves of the separator plates. Thus, this cell stack exhibited no sealing problem caused by dimensional difference between the separator plate and the gasket due to mold shrinkage of the gasket and gate marks (approximately 50 $\mu$m high) of the dummy ribs.

Table 1 shows a comparison between the characteristics of the cell stack of Example 1 and the characteristics of comparative example 1. Comparative example 1 is an example in which the seal ribs of the gasket were omitted from Example 1, and the dummy ribs were so fitted into the grooves of the separator plates as to seal the cell.

The evaluation points are as follows:

(1) Working Cross Leakage Test

The above-described stack of three cells (separator area: 12×12=144 $cm^2$) was clamped at 1440 kgf (clamping pressure 1 MPa), and a nitrogen gas supply source was connected to the anode side thereof. While the supply pressure was retained at 50 kPa, the amount of gas leaking out of the cathode side was measured.

(2) Working Outward Leakage Test

The above-described stack of three cells was clamped at 1440 kgf (clamping pressure 1 MPa). A nitrogen gas supply source having a pressure of 50 kPa was connected to the anode and the cathode thereof, and the amount of gas flowing in (which is equal to the amount of gas flowing out, i.e., the amount of outward leakage) was measured.

(3) Minimum Clamping Pressure Test

A nitrogen gas supply source was connected to the anode and the cathode of the above-described stack of three cells. While the supply pressure was retained at 50 kPa, the clamping pressure of the cell stack necessary for reducing the amount of gas flowing in (which is equal to the amount of gas flowing out, i.e., the amount of outward leakage) to 0.01 ml/min or less was measured.

The results of these tests are shown in Table 1.

TABLE 1

| | Working cross leakage test | Working outward leakage test | Minimum clamping pressure test |
|---|---|---|---|
| Comparative Example 1 | 14.5 ml/min | 2.8 ml/min | 1820 kgf |
| Example 1 | 0.01 ml/min or less | 0.01 ml/min or less | 456 kgf |

As is clear from the results of Table 1, according to the stack structure of gasket/separator plate of the present invention, it is possible to prevent cross leakage and outward leakage with the application of much lower clamping pressures than the conventional pressures. This is presumably because the height of the seal ribs is greater than that of the surface unevenness of the standard thickness portion of the gasket and because this physical structure allows the pressure to apply locally only to the seal ribs. Accordingly, even without the dummy ribs, the provision of only the seal ribs would make it possible to obtain sufficient sealing effects with the application of low clamping pressures, provided that there is no requirement of thinning the gasket.

EXAMPLE 2 TO 4

In the same manner as in Example 1, gaskets were molded so as to have a structure as illustrated in FIG. 18 (Example 2), a structure as illustrated in FIG. 16 (Example 3), and a structure as illustrated in FIG. 17 (Example 4) in the vicinity of the manifold apertures. Using these gaskets, MEAs were produced in the same manner as in Example 1. Separator plates were designed and produced in the same manner as in Example 1, and using the MEAs and separator plates thus produced, stacks of 3 cells were produced.

These cell stacks were subjected to the following characteristic evaluation tests:

(1) Working Cross Leakage Test

The above-described stacks of three cells (separator area: 12×12=144 cm$^2$) were clamped at 1440 kgf (clamping pressure 1 MPa), and a nitrogen gas supply source was connected to the anode side thereof. While the supply pressure was retained at 50 kPa, the amount of gas leaking out of the cathode side was measured.

(2) Marginal Cross Leakage Test

The above-described stacks of three cells were clamped at 1440 kgf (clamping pressure 1 MPa), and the gas supply pressure on the anode side was gradually increased until the gas leaked out of the cathode side. The supply pressure upon the gas leakage out of the cathode side was measured.

The results of these tests are shown in Table 2.

TABLE 2

|  | Working cross leakage test | Marginal cross leakage test |
| --- | --- | --- |
| Example 1 | 0.01 ml/min or less | 189 kPa |
| Example 2 | 0.01 ml/min or less | 222 kPa |
| Example 3 | 0.01 ml/min or less | 306 kPa |
| Example 4 | 0.01 ml/min or less | 265 kPa |

As shown in Table 2, no cross leakage was observed, in any of the examples, at working pressure (the gas supply pressure is normally 50 kPa on both the anode side and the cathode side). Also, in any of the examples, the cell open-circuit voltage (OCV) was approximately 0.99 V, thereby causing no problem in practical use. The purpose of the marginal cross leakage test was to find the behaviors of the cells in the case of non-steady-state operations of the gas supply system, for example, valve opening/closing. The results of these tests indicate that by forming a plurality of seal ribs around each of the manifold apertures, the anode, the cathode or the like and by modifying the backside of the gas passages of the gasket as in Examples 2 to 4, the test results can be improved, thereby becoming suited for applications of high gas supply pressures (the supply pressure for automobile use is approximately 180 kPa, but the pressure difference between the electrodes is, at the maximum, one third or one fourth.

The present invention can produce a fuel cell having high gas sealing properties with the application of low clamping pressures, thereby contributing to improved reliability of fuel cells.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A polymer electrolyte fuel cell comprising a unit cell, said unit cell comprising:

(1) a membrane electrode assembly comprising a polymer electrolyte membrane, a gasket which is formed of a sealing material and covers a periphery of said electrolyte membrane, an anode attached to one face of said electrolyte membrane, and a cathode attached to the other face of said electrolyte membrane; and (2) an anode-side conductive separator plate and a cathode-side conductive separator plate sandwiching said membrane electrode assembly therebetween, (3) said gasket, said anode-side conductive separator plate and said cathode-side conductive separator plate having a pair of fuel gas manifold apertures, a pair of oxidant gas manifold apertures and a pair of cooling water manifold apertures, (4a) said gasket comprising, on an anode-situated side, a seal rib which surrounds a fuel gas flow section extending from one of said fuel gas manifold apertures through the anode into the other of said fuel gas manifold apertures and seal ribs which surround each of said cooling water manifold apertures, (4b) said gasket comprising, on a cathode-situated side, seal ribs which surround each of said fuel gas manifold apertures and said cooling water manifold apertures, (5) said anode-side conductive separator plate comprising a fuel gas flow path which communicates with said pair of fuel gas manifold apertures on an anode-facing side, (6) said cathode-side conductive separator plate comprising an oxidant gas flow path which communicates with said pair of oxidant gas manifold apertures on a cathode-facing side, (7) each of said seal ribs of said gasket being pressed against the surface of said anode-side conductive separator plate or said cathode-side conductive separator plate by clamping pressure of said unit cell.

2. The polymer electrolyte fuel cell in accordance with claim 1, wherein said gasket further comprises: seal ribs surrounding each of said oxidant gas manifold apertures, formed on the anode-situated side; and a seal rib surrounding an oxidant gas flow section extending from one of said oxidant gas manifold apertures through the cathode into the other of said oxidant gas manifold apertures, formed on the cathode-situated side.

3. A polymer electrolyte fuel cell comprising a unit cell, said unit cell comprising:

(1) a membrane electrode assembly comprising a polymer electrolyte membrane, a gasket which is formed of a sealing material and covers a periphery of said electrolyte membrane, an anode attached to one face of said electrolyte membrane, and a cathode attached to the other face of said electrolyte membrane; and (2) an anode-side conductive separator plate and a cathode-side conductive separator plate sandwiching said membrane electrode assembly therebetween, (3) said gasket, said anode-side conductive separator plate and said cathode-side conductive separator plate having a pair of fuel gas manifold apertures, a pair of oxidant gas manifold apertures and a pair of cooling water manifold apertures, (4a) said gasket comprising, on an anode-situated side, a seal rib which surrounds a fuel gas flow section extending from one of said fuel gas manifold apertures through the anode into the other of said fuel gas manifold apertures and seal ribs which surround each of said cooling water manifold apertures, (4b) said gasket comprising, on a cathode-situated side, seal ribs which surround each of said fuel gas manifold apertures and said cooling water manifold apertures, (4c) said gasket comprising a dummy rib which at least partially surrounds one of said seal ribs on the anode-situated side and a dummy rib which at least surrounds one of said seal ribs on the cathode-situated side, (4d) the height of said dummy rib being greater than the height of each of said seal ribs, (5) said anode-side conductive separator plate comprising, on an anode-facing side, a groove into which said dummy rib is fitted loosely such that there is a clearance therebetween and a fuel gas flow path which communicates with said pair of fuel gas manifold apertures, (6) said cathode-side conductive separator plate comprising, on a cathode-facing side, a groove into which said dummy rib is fitted loosely such that there is a clearance therebetween and an oxidant gas flow path which communicates with said pair of oxidant gas manifold apertures, (7) each of said seal ribs of said gasket being pressed against the surface of said anode-side conductive separator plate or said cathode-side conductive separator plate by clamping pressure of said unit cell.

4. The polymer electrolyte fuel cell in accordance with claim 3, wherein said gasket further comprises: seal ribs surrounding each of said oxidant gas manifold apertures, formed on the anode-situated side; and a seal rib surrounding an oxidant gas flow section extending from one of said oxidant gas manifold apertures through the cathode into the other of said oxidant gas manifold apertures, formed on the cathode-situated side.

5. The polymer electrolyte fuel cell in accordance with claim 4, wherein said dummy rib on the anode-situated side substantially surrounds said seal rib surrounding said fuel gas flow section, and said dummy rib on the cathode-situated side substantially surrounds said seal rib surrounding said oxidant gas flow section.

6. The polymer electrolyte fuel cell in accordance with claim 5, wherein said gasket further comprises, on the anode-situated side, dummy ribs surrounding each of said seal ribs surrounding said oxidant gas manifold apertures and said cooling water manifold apertures, and further comprises, on the cathode-situated side, dummy ribs surrounding each of said seal ribs surrounding said fuel gas manifold apertures and said cooling water manifold apertures.

7. A polymer electrolyte fuel cell comprising a unit cell, said unit cell comprising:

(1) a membrane electrode assembly comprising a polymer electrolyte membrane, a gasket which is formed of a sealing material and covers a periphery of said electrolyte membrane, an anode attached to one face of said electrolyte membrane, and a cathode attached to the other face of said electrolyte membrane; and (2) an anode-side conductive separator plate and a cathode-side conductive separator plate sandwiching said membrane electrode assembly therebetween, (3) said gasket, said anode-side conductive separator plate and said cathode-side conductive separator plate having a pair of fuel gas manifold apertures, a pair of oxidant gas manifold apertures and a pair of cooling water manifold apertures, (4a) said gasket comprising, on an anode-situated side, dummy ribs which surround each of said fuel gas manifold apertures, said oxidant gas manifold apertures and said cooling water manifold apertures; first seal ribs which surround each of said manifold apertures inside each of said dummy ribs; fuel gas passages which include a notch formed at an anode-facing side of said dummy ribs surrounding each of said fuel gas manifold apertures; a second seal rib which surrounds the anode; and third seal ribs which connect the seal ribs, of said first seal ribs, surrounding said fuel gas manifold apertures with said second seal rib, said third seal ribs being provided on both sides of each of said fuel gas passages, (4b) said gasket comprising, on a cathode-situated side, dummy ribs which surround each of said fuel gas manifold apertures, said oxidant gas manifold apertures and said cooling water manifold apertures; first seal ribs which surround each of said manifold apertures inside each of said dummy ribs; oxidant gas passages which include a notch formed at a cathode-facing side of said dummy ribs surrounding each of said oxidant gas manifold apertures; a second seal rib which surrounds the cathode; and third seal ribs which connect the seal ribs, of said first seal ribs, surrounding said oxidant gas manifold apertures with said second seal rib, said third seal ribs being provided on both sides of each of said oxidant gas passages, (4c) the height of each of said dummy ribs being greater than the height of each of said first, second and third seal ribs, (5) said anode-side conductive separator plate comprising, on an anode-facing side, grooves into which each of said dummy ribs is fitted loosely such that there is a clearance therebetween and a fuel gas flow path which communicates with said pair of fuel gas manifold apertures, (6) said cathode-side conductive separator plate comprising, on a cathode-facing side, grooves into which each of said dummy ribs is fitted loosely such that there is a clearance therebetween and an oxidant gas flow path which communicates with said pair of oxidant gas manifold apertures, (7) said fuel gas passages and said oxidant gas passages of said gasket communicating with said fuel gas flow path of said anode-side conductive separator plate and said oxidant gas flow path of said cathode-side conductive separator plate, respectively, (8) each of said first, second and third seal ribs of said gasket being pressed against the surface of said anode-side conductive separator plate or said cathode-side conductive separator plate by clamping pressure of said unit cell except for in said fuel gas passages and said oxidant gas passages.

8. The polymer electrolyte fuel cell in accordance with claim 7, wherein said first seal ribs and said second seal rib on the cathode-situated side of said gasket are located in alignment with said first seal ribs and said second rib on the anode-situated side, respectively, seal ribs are provided on the anode-situated side in alignment with said third seal ribs on the cathode-situated side, and seal ribs are provided on the cathode-situated side in alignment with said third seal ribs on the anode-situated side.

9. The polymer electrolyte fuel cell in accordance with claim 7, wherein said dummy ribs surrounding each of said fuel gas, oxidant gas and cooling water manifold apertures on the anode-situated side are connected to one another, and said dummy ribs surrounding each of said fuel gas, oxidant gas and cooling water manifold apertures on the cathode-situated side are connected to one another.

10. The polymer electrolyte fuel cell in accordance with claim 7, wherein said gasket has a plurality of reinforcing ribs in each of said fuel gas passages and said oxidant gas passages, said anode-side conductive separator plate and said cathode-side conductive separator plate have a depression for receiving said reinforcing ribs, said depression being formed in the vicinity of each end of said fuel gas flow path and said oxidant gas flow path, said depression is adapted to support the top faces of said reinforcing ribs, said first and second seal ribs located in said fuel gas passages and said oxidant gas passages are pressed against said anode-side conductive separator plate and said cathode-side conductive separator plate, respectively, except for portions corresponding to said fuel gas flow path and said oxidant gas flow path of said anode-side and cathode-side conductive separator plates.

11. The polymer electrolyte fuel cell in accordance with claim 7, wherein at least one of said first, second and third seal ribs is composed of a plurality of seal ribs.

12. The polymer electrolyte fuel cell in accordance with claim 1, wherein the gasket covers an outer edge of the electrolyte membrane.

13. The polymer electrolyte fuel cell in accordance with claim 1, wherein the gasket covers a side surface of the electrolyte membrane.

14. The polymer electrolyte fuel cell in accordance with claim 1, wherein the gasket surrounds the electrolyte membrane.

* * * * *

UNITED STATES PATENT AND TRADEMARK OFFICE
CERTIFICATE OF CORRECTION

PATENT NO.    : 6,790,552 B2
DATED         : September 14, 2004
INVENTOR(S)   : Susumu Kobayashi et al.

It is certified that error appears in the above-identified patent and that said Letters Patent is hereby corrected as shown below:

Title page,
Item [56], References Cited, FOREIGN PATENT DOCUMENTS,
below
"WO    WO 02/061869 A1    8/2002", add
-- JP    2001-102072    4/2001
   JP    2002-042834    2/2002 --;
Item [57], ABSTRACT,
Lines 3 and 4, change "fuel cell a membrane" to -- fuel cell has a membrane --.

Signed and Sealed this

Fourth Day of October, 2005

JON W. DUDAS
*Director of the United States Patent and Trademark Office*